United States Patent [19]
Batsch et al.

[11] 3,781,020
[45] Dec. 25, 1973

[54] DIAMOND STYLUS FOR DISC RECORDS

[75] Inventors: Helmut Batsch; Benno Jahnel, both of Berlin; Ernst August Weinz, Idaroberstein; Wolfgang Berger; Gerhard Dickopp, both of Berlin, all of Germany

[73] Assignee: Licentia Patent-Verwaltungs-G.m.b.H., Frankfort am Main, Germany

[22] Filed: Nov. 29, 1971

[21] Appl. No.: 202,988

[30] Foreign Application Priority Data
Nov. 30, 1970  Germany.................. P 20 60 317.2
Nov. 30, 1970  Germany............ HGM 70 45 295.8

[52] U.S. Cl. ................................................. 274/38
[51] Int. Cl. .............................................. G11b 3/44
[58] Field of Search...................... 33/18 R; 274/38; 125/39

[56] References Cited
UNITED STATES PATENTS
3,138,875  6/1964  Christensen......................... 33/18 R
1,373,635  4/1921  Rammelsberg ....................... 274/38

FOREIGN PATENTS OR APPLICATIONS
599,964  7/1934  Germany ............................. 274/38
300,220  8/1917  Germany ............................. 274/38

OTHER PUBLICATIONS
Industrial Diamond Review. Vol. 20, Feb. 1960, Pages 31–37.

Primary Examiner—Harry N. Haroian
Attorney—George H. Spencer et al.

[57] ABSTRACT
A pressure scanning diamond stylus having an elongated lower edge in a wear resistant crystallographic orientation.

15 Claims, 17 Drawing Figures

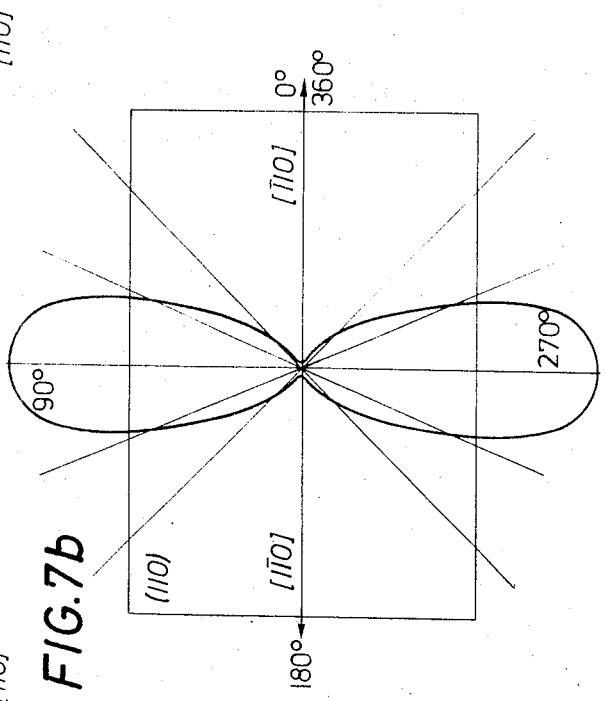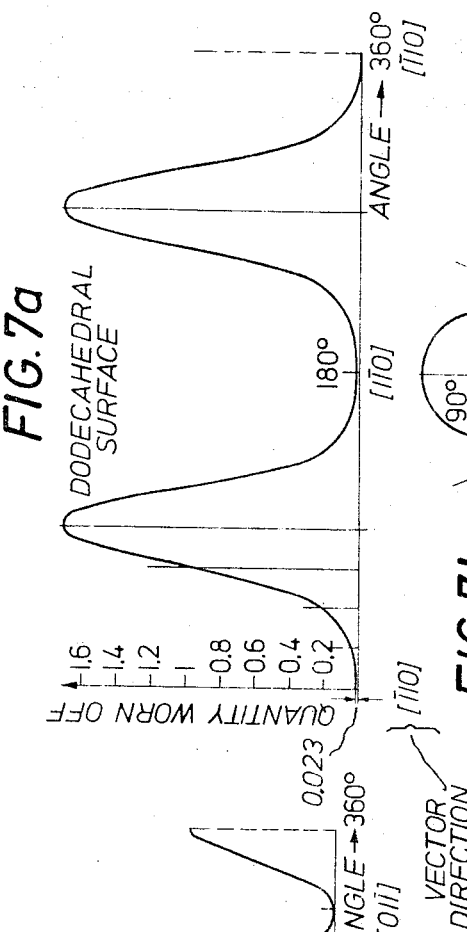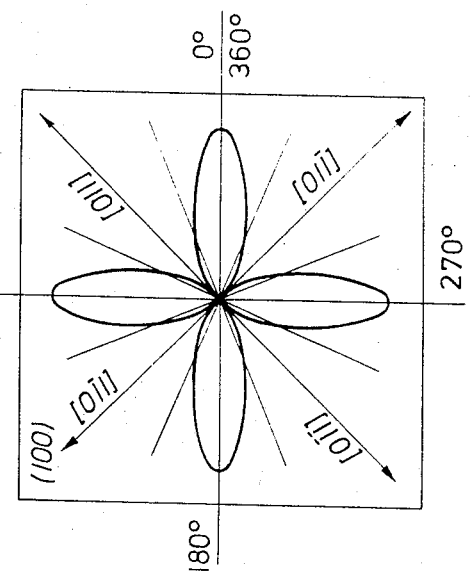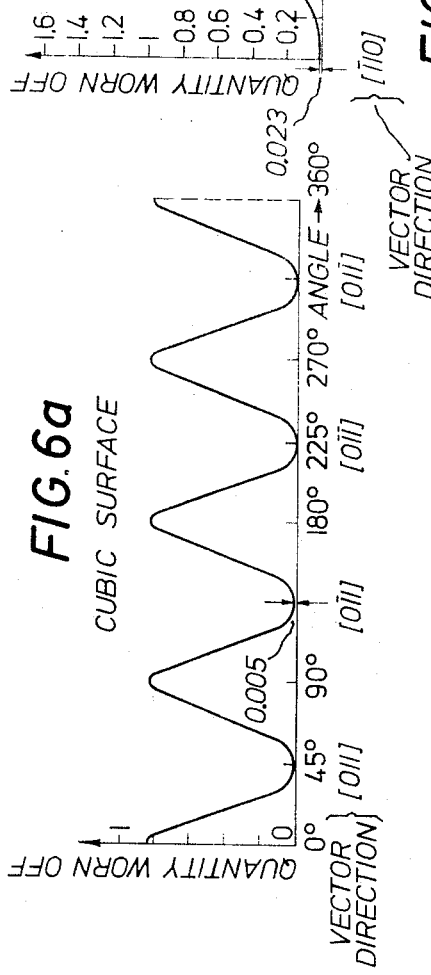

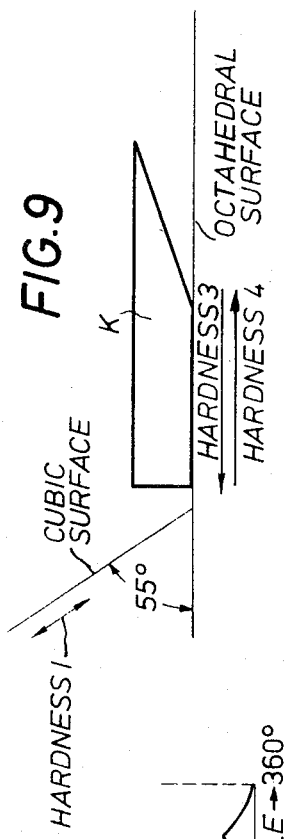
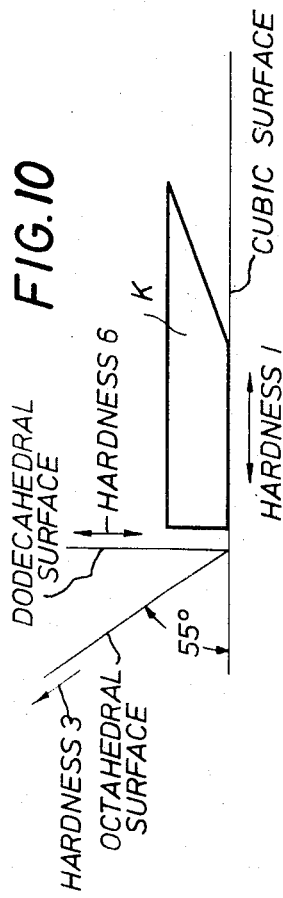
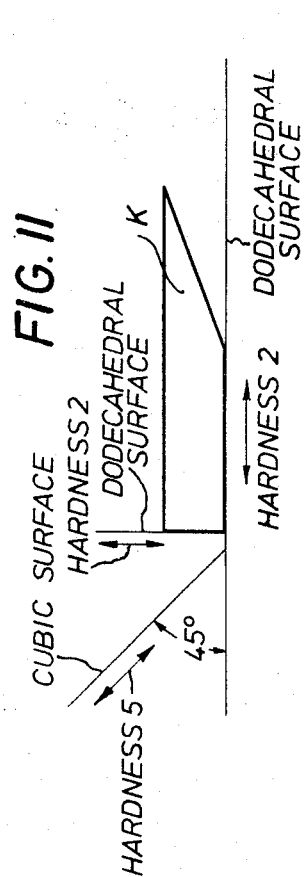
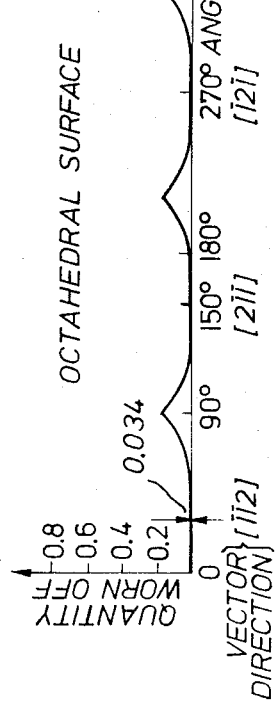
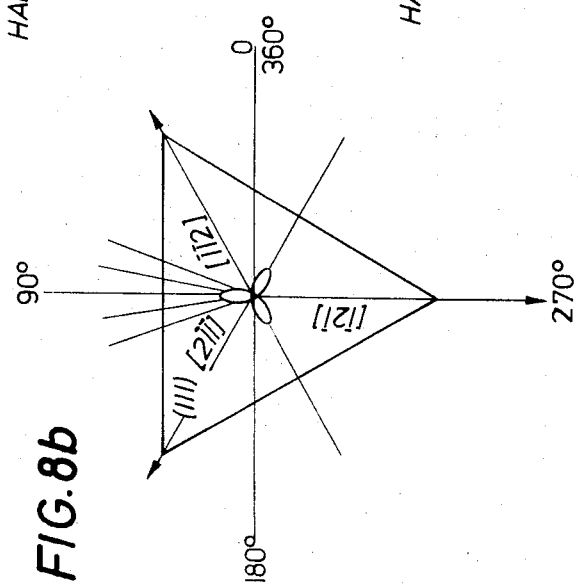

DIAMOND STYLUS FOR DISC RECORDS

BACKGROUND OF THE INVENTION

The present invention relates to diamond styluses for guiding a pickup in the grooves of, for example, a disc record and, optionally, also for sensing information-storing, physical undulations in the grooves. More particularly, the present invention relates to styluses for sensing a recording of a broad-band signal frequency mix on a mechanical carrier, such styluses being of the type disclosed in U. S. Pat. application Ser. No. 798,709 filed Feb. 12, 1969, by Gerhard Dickopp et al., for a "System for Reproducing Mechanically Recorded Signals."

While it was previously only possible to sense physical undulations in the grooves of a disc record up to a frequency of about 20,000 cycles per second, it has now become possible to sense undulations having a frequency of far greater magnitude, for example up to several megacycles per second. The sensing able to detect these higher frequencies has been disclosed in the above-mentioned application Ser. No. 798,709. The stylus has an elongated lower edge and rides with pressure contact on a plurality of the physical protrusions of the undulations in a disc record. The trailing portion of the elongated lower edge is abruptly ended by a substantially vertical stylus face and, as the elongated lower edge suddenly loses contact with individual protrusions, there occurs an abrupt relieving of pressure on the stylus. This is registered by an electromechanical transducer and appears as an electrical output signal.

During pressure scanning of the above-described type, there is scarcely any macroscopic movement of the pickup, since the pickup inertia prevents it from macrosocpically responding to the high frequency undulations.

For recording and playing back signal oscillations in the megacycles/second range, the record carrier, for instance a disc record, must move at a high rotational velocity; for example for video signals a disc record must move at 25 revolutions per second. It has been found that disc records themselves can withstand a high number of repetitions of the playback process without any reduction in quality. In contrast, the stylus, although made, for example, of diamond, eventually shows signs of wear and must be replaced.

It has been found in practice that, in spite of the use of wear-resistant diamond material, pressure scanning styluses are worn down sometimes already after 15 to 20 hours of playing time.

SUMMARY OF THE INVENTION

An object of the present invention, therefore, is to provide a pressure scanning diamond stylus of increased wear-resistance.

This as well as other objects which will become apparent in the discussion that follows are achieved, according to the present invention, by a pressure-scanning diamond stylus having its elongated lower edge in a wear-resistant crystallographic orientation.

GENERAL ASPECTS OF THE INVENTION

In one embodiment of the invention, the elongated lower edge lies within about ± 15° of a crystallographic octahedral plane of the type (111) whose vector representation, i.e. the [111] vector, points downwards out of the diamond stylus as shown in FIGS. 1 and 2, with the vector direction of the type [1$\bar{1}$2] lying within ± 15° of the direction of elongation of the lower edge and pointing from the leading portion of the lower edge toward the trailing portion (i.e. the [1$\bar{1}$2] vector points in the same direction as the friction force acting on the stylus when it is in contact with a disc record).

Regarding the significance of the crystallographic planes and directions, and their indices, reference is made to the book "Anorganische Chemie" [Inorganic Chemistry] by Walter Hückel, published by Verlag Akademische Verlagsgesellschaft, Leipzig Cl, 1950, pages 164 and 165. Reference is also made to the book "Elements of X-Ray Diffraction" by B. D. Cullity, published by Addison-Wesley, Reading, Massachusetts, 1956, pages 37 to 39 and 48 to 49; and to "An Introduction to Crystal Chemistry" by R. C. Evans, published by Cambridge University Press, Cambridge, 1952, pages 28 and 29.

In a further embodiment of the present invention, the elongated lower edge lies in a crystallographic cubic plane of the type (100) with the vector direction of the type [011] lying in the direction of elongation of the lower edge, with tolerances of ± 15° likewise being comprehended here.

In another embodiment of the present invention, the elongated lower edge lies in a crystallographic dodecahedral plane of the type (110) with the vector direction of the type [$\bar{1}$10] lying in the direction of elongation of the lower edge, with tolerances of ± 15° likewise being comprehended here.

Since the elongated lower edge of the stylus of the invention generally is often tilted upwards from the trailing portion to the leading portion at a small angle of 3° to 10° with respect to the center line of the groove, it is preferred to set the direction of optimum abrasion resistance tilted oppositely at such an angle. This then assures during use that the preferred direction of the optimum abrasion resistance at least approximately coincides with the direction of the relative velocity or with the direction of the friction force exerted on the stylus.

BRIEF DESCRIPTION OF THE DRAWINGS

FIGS. 6a and 6b, 7a and 7b, and 8a and 8b, are graphical representations of wear in diamond.

FIGS. 9 to 11 are elevational views of diamond styluses according to the invention.

DETAILED DESCRIPTION OF THE PREFERRED EMBODIMENTS

Figure 1:
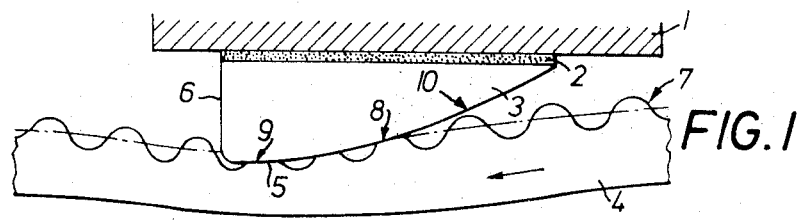
FIG. 1 is an elevational view of a pickup in contact with a disc record.
Figure 2:
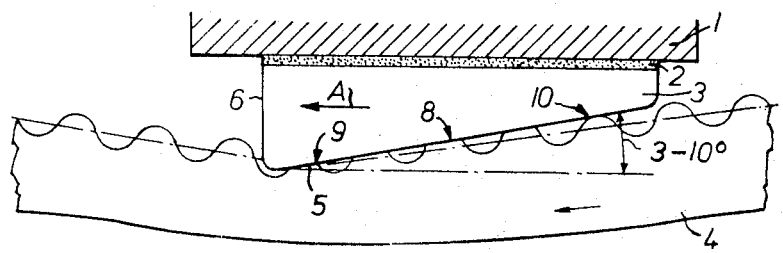
FIG. 2 is an elevational view of a modified pickup in contact with a disc record.

FIGS. 1 and 2 have been adapted from U.S. Pat. application Ser. No. 142,237 filed May 11, 1971, by Gerhard Dickopp for a "Pressure Responsive Playback Device for Mechanically Recorded Signals."

FIG. 1 illustrates a diamond stylus 3 in contact with a groove formed in record disc 4 and having its walls provided with undulations 7 corresponding to the recorded signal. The pickup including the stylus is caused to bear with its elongated lower edge 8 against the disc with a force sufficient to elastically deform the record disc, and to cause the undulation peaks 5 to be compressed beneath the stylus, in the manner illustrated in the drawing. The direction of movement of the record disc 4 relative to the stylus 3 is shown by the arrow. The compression of the peaks is greater at the trailing portion 9 of the edge 8 than at its leading portion 10.

The pickup includes a transducer body 1, which is preferably a piezoelectric ceramic body, to which the playback stylus 3 of diamond is rigidly fastened by a glue or solder joint 2. When the record disc is caused to move relative to the stylus 3, the resultant reaction force applied by the elastically deformed disc to the stylus 3 is applied to ceramic body 1 and converted by suitable circuitry connected to the body into a corresponding output signal. This force alternates at a rate determined by the recorded wavelength and only its average value is determined by the bearing force with which the stylus is applied against the record disc.

FIG. 2 differs from FIG. 1 only in that the elongated lower edge is a straight line inclined 3° to 10° from the undeflected plane of the record.

Stylus face 6 is substantially vertical and abruptly ends elongated lower edge 8. It functions to create a sudden loss of contact between the lower edge and an undulation peak.

Figure 3:
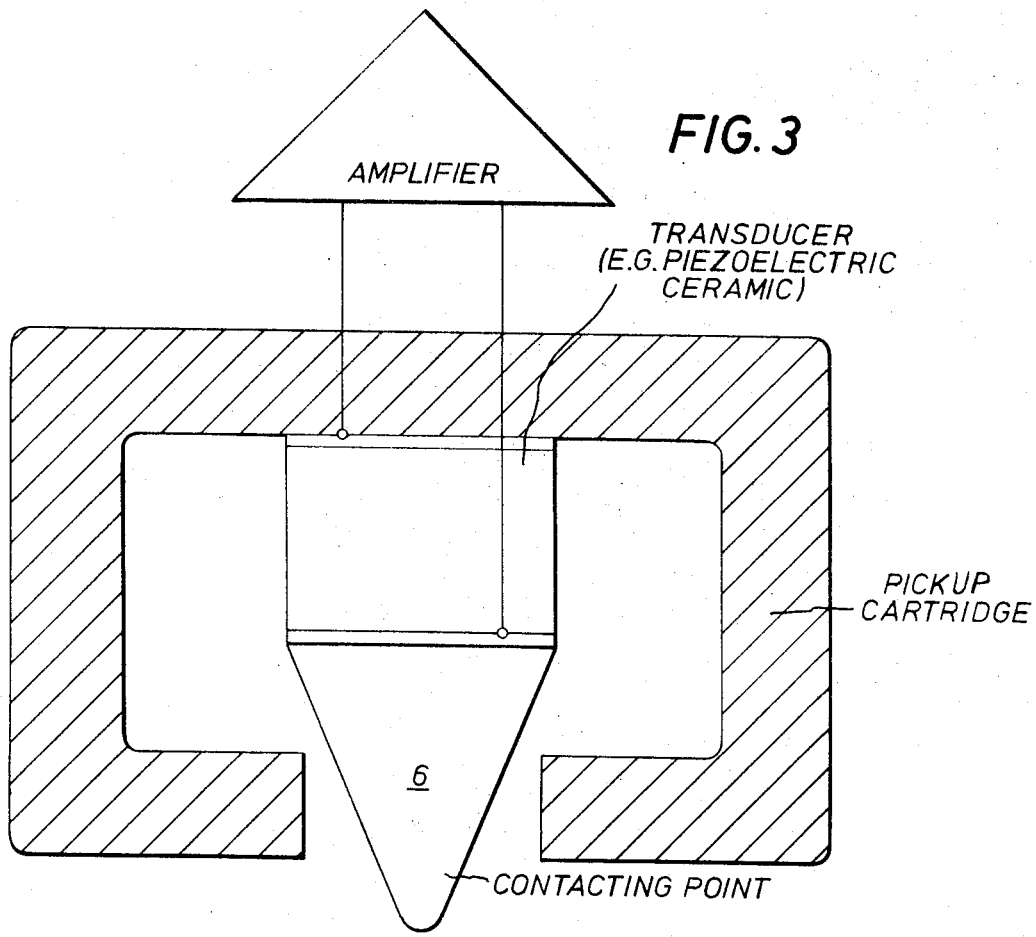
FIG. 3 is a left side view of the pickup of FIG. 2.

FIG. 3 views FIGS. 1 and 2 from their left sides and shows that the contacting point (the edge 8 appears as a point in FIG. 3) may actually be rounded off. FIG. 3 additionally shows leads bringing the voltages appearing across the transducer to an amplifier; and a pickup cartridge.

The stylus 3 of FIG. 2, if it is intended to serve for scanning frequency modulated video signals, may have a length in the direction of the groove axis of approximately 0.2mm. Its bottom portion is wedge-shaped, as is evident from a comparison of FIG. 3. The edge 8 of the stylus is rounded as shown in FIG. 3 in a plane normal to the groove axis and has a radius of curvature of approximately $4\mu$ in that plane. The face 6 has a height of approximately $80\mu$.

A spiral-shaped groove is disposed in the record surface and is formed so that its walls enclose an angle of approximately 140° normal to the groove axis. The groove walls present the elastically depressable relief-shaped undulations which are shaped to constitute a spatial representation of a frequency modulated oscillation. The wavelength of the cyclic undulation alternations varies between $2\mu$ and $5\mu$. The difference in height between a peak and a valley of the undulations is approximately $1\mu$.

The rounded tracing edge of the wedge-shaped stylus slides upon the undulations of both groove walls and thus almost completely levels the undulations elastically. The stylus vertex, between the edge 8 and 6 in FIG. 2, has a radius of curvature of approximately $0.2\mu$ in a plane containing the groove axis.

The scanned signal has instantaneous frequencies between 2.75 MHz and 3.75 MHz, i.e., the frequency excursion of the scanned frequency modulated oscillations is 1 MHz. The ceramic transducer body 1 effects a proportional conversion of the alternating force exerted on it into an electrical voltage.

The structure of FIGS. 1 and 2 may be incorporated with other disc recording structure, for example that disclosed in U.S. Pat. application Ser. No. 154,545 filed June 18, 1971, by Eduard Schüller et al. for a "Positively Guided Disc Record Pickup."

Figure 4:
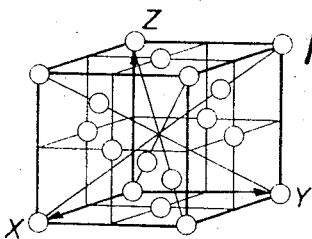
FIG. 4 is a perspective view of the unit cell of diamond.

Referring now to FIG. 4, there is shown the unit cell of diamond. The circles at the corners and faces of the cube, and at the certain ¼, ¼, ¼ type locations within the cube, represent carbon atoms. The positional relationships of the carbon atoms relative to the axes X, Y, and Z are the same in the remaining Figures.

In a diamond crystal, three distinct types of natural surfaces are found:

1. the cubic planes of the type (100);
2. the dodecahedral planes of the type (110); and
3. the octahedral planes of the type (111).

Figure 5A:
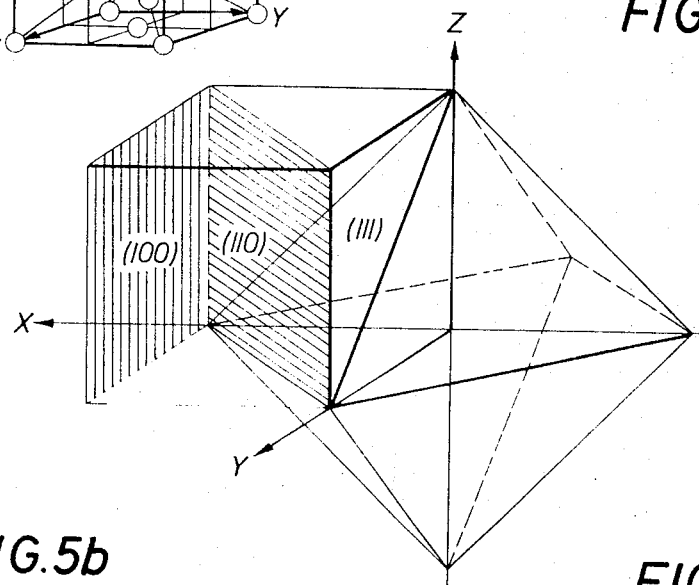
FIGS. 5a to 5d are perspective views of different crystallographic planes and directions in diamond.

In FIG. 5a these areas are shown for a crystal cube, reference being had to FIG. 4 for the atom locations.

Figure 5B:
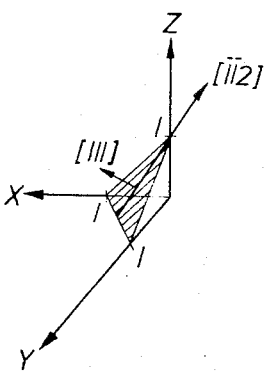
Figure 5C:
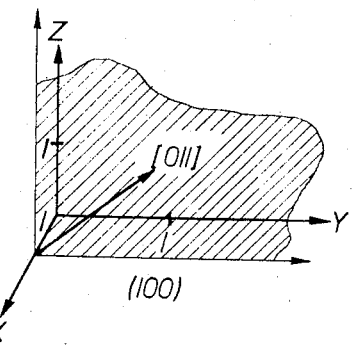
Figure 5D:
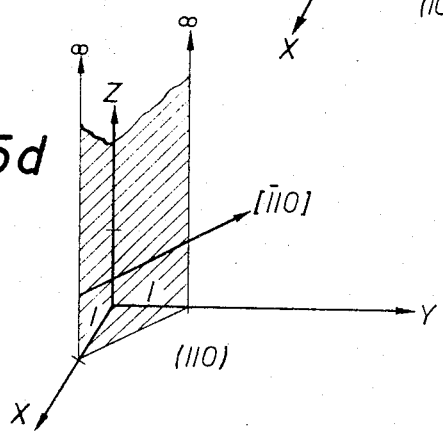

In FIGS. 5b, 5c and 5d, sections of FIG. 5a are shown to facilitate understanding of FIG. 5a.

FIG. 5b relates to the above-mentioned first embodiment of a stylus according to the present invention in which the preferred direction of the least wear lies in an octahedral plane. In the coordinate system X, Y, Z, the naturally occurring octahedral area (111) is shown. It intersects the axes X, Y, Z at the coordinate values 1, 1 and 1. The vector [111] representing the (111) plane, i.e. the vector normal to the (111) plane, is illustrated by the appropriately marked arrow. The direction of the angle bisector of the triangle 1, 1, 1 lying in the coordinate system is marked [1̄1̄2] and is the direction of highest abrasion resistance when the [111] vector points downwards, out of the edge 8.

When one considers the position of the carbon atoms at the ¼, ¼, ¼ type positions, it is evident that the corresponding direction of highest abrasion resistance for the (11̄1) plane is the [112] direction when the [11̄1̄] vector points upwards in FIGS. 1 and 2, into the diamond, from edge 8.

In a corresponding illustration in FIG. 5c the second embodiment of a stylus according to the invention is shown in which the direction of relatively optimum abrasion resistance lies in the naturally present cubic planes of the diamond crystal system. In the coordinate system X, Y, Z the plane (100) lies parallel to the plane determined by the Y and Z axes and intersects the X axis at the coordinate value 1. The preferred direction [011], which represents the direction of relatively optimum abrasion resistance in the cubic plane (100), lies within this plane. This preferred direction is at an angle of 45° with respect to the parallels to the Y and Z axes in the plane (100).

In FIG. 5d an analogous illustration for the dodecahedral area of the natural diamond crystal is shown. The plane is designated (110), for it intersects the X and Y axes at the coordinate values $X = 1$ and $Y = 1$ with $Z = 0$. Within this plane, the preferred direction of use for the present invention lies in the direction of the drawn arrow; this direction is identified by the symbol [1̄10]. This direction is always parallel to the line between the axial points $X = 1$ and $Y = 1$, where the plane (110) intersects the X and the Y axes.

FIGS. 6 to 8 show empirically determined diagrams for abrasion resistance (this is known to be a measure for the hardness), as a function of the angle at which the abrading surface was moving relatively across the diamond surface. The quantity worn off under unchanging external conditions is plotted, so that the minimums correspond to directions of maximum abrasion resistance.

FIG. 6a shows the conditions for the cubic (100) plane in the rectangular coordinate system, while FIG. 6b shows it in polar coordinates. In the polar coordinate illustration the (100) plane of FIG. 5a is also indicated. The same is shown in FIGS. 7a and 7b for the dodecahedral plane (110) and in FIGS. 8a and 8b for the octahedral plane (111). The planes appear in the polar coordinate graphs.

It can clearly be seen in the diagrams of FIGS. 6 to 8 that the wear resistance is greatest in certain directions and is still quite high in their vicinity within a certain tolerance range. By selecting an appropriate cutting angle when the stylus is cut out of a raw diamond, it is possible to produce a stylus with optimum abrasion resistance.

Different hardness stages — smallest and largest amount of surface wear — can be derived from the diagrams of FIGS. 6 to 8.

Hardness stage 1: cubic planes at 45°, 135°, 225°, 315° (hardest direction of all).

Hardness stage 2: dodecahedral planes at 0°, 180°, 360°.

Hardness stage 3: octahedral planes at 30°, 150°, 270°.

Hardness stage 4: octahedral planes at 90°, 210°, 330°.

Hardness stage 5: cubic planes at 0°, 90°, 180°, 270°, 360°.

Hardness stage 6: dodecahedral planes at 90°, 270° (softest direction of all).

The hardness stages 1 to 6 here do not have the meaning of a hardness scale, but are rather arbitrarily selected terms for the orientations of the mentioned directions in which the thus identified hardness stages occur. As can be seen, the hardness decreases with increasing number.

As already mentioned above, the stylus of the type illustrated in FIGS. 1 and 2 includes an elongated lower edge of wedge shape which engages in the grooves of the signal carrier to be scanned. This lower edge is at an acute angle of approximately 3° to 10° either linearly or according to a fixed curve in the direction of movement, while the face 6 lies approximately perpendicular to the carrier plane and to the direction of movement. The abruptly ending trailing portion of edge 8 is of particular importance for a pressure scanning stylus.

For the selection of the optimum cut, it is thus the abrasion resistance of edge 8 in contact with the carrier as well as the stability of the sharp perpendicular edge 6 which are decisive.

A relatively optimum cut is obtained by cutting the stylus out of a raw crystal in such a manner that the edge 8 contacting the signal carrier lies in an octahedral plane of the type (111) with the [$\bar{1}\bar{1}2$] direction lying in the direction of the friction force exerted by the carrier on the stylus, this within a tolerance range of about ±15°.

According to a variation, the cut can also be so selected that the edge 8 contacting the signal carrier lies in the diagonal of a cubic plane (e.g. the [011] direction of FIG. 5c), again comprehending a tolerance range of about ±15°.

In the polar diagrams according to FIGS. 8b for the octahedral plane and FIG. 6b for the cubic area it can be seen that for the above-given orientations the quantity worn off is least, i.e. the abrasion resistance is highest.

A further usable variation of the cut consists in having the edge 8 of the stylus — again under comprehension of a tolerance of about ±15° — lie on the center line which connects the shorter sides of the rectangle of a dodecahedral plane, e.g. the [$\bar{1}10$] direction of FIG. 5d.

FIGS. 9-11 show these orientations, for example, in conjunction with schematically illustrated styluses. According to FIG. 9, stylus K is cut out of the raw crystal in such a manner that, as can be seen, the portion of stylus K contacting the signal carrier lies on an octahedral plane and, as indicated by the arrow marked "hardness 3", with an orientation in the scanning direction or friction force direction. The cubic plane is then inclined thereagainst at an angle of 55°. The edge stability is here very good.

With a selection of the cut according to FIG. 10, the stylus K which contacts the signal carrier lies in the diagonal of a cubic plane. The abrasion resistance is here better than in the arrangement according to FIG. 9 ("hardness 1" in FIG. 10), however the sensitivity regarding edge wear is greater since the octahedral plane which is inclined against the cubic plane by 55° only has hardness 3 as compared to the cubic plane with hardness 1 according to FIG. 9. For a cut according to FIG. 11 the edge contacting the signal carrier lies in the center line which connects the shorter sides of the rectangle of the dodecahedral plane. The cubic plane, however, is inclined by 45°. The wear resistance is very good with sufficient edge stability.

Since the frictional force in FIGS. 1 and 2 is more generally in the direction of the horizontal of the undeflected disc record, it is preferred as brought out in the General Aspects of the Invention to account for this by having the elongated lower edge 8 tilted downwardly from the wear resistant plane and direction by an amount equal to the inclination of the edge, this lying between 3° and 10° as shown in FIG. 2, the vertex of the tilting lying in the leading portion 10. Thus, the wear resistant direction is that of horizontal arrow A in FIG. 2 and the wear resistant plane is perpendicular to the plane of FIG. 2.

It will be understood that the above description of the present invention is susceptible to various modifications, changes and adaptations, and the same are intended to be comprehended with the meaning and range of equivalents of the appended claims.

We claim:

1. A pressure scanning diamond stylus having an elongated lower edge in a wear resistant crystallographic orientation, said edge lying substantially, with a tolerance range of about ± 15°, in a crystallographic octahedral plane of the type (111) and extending parallel to a direction of the type [$\bar{1}\bar{1}2$], the vector [111] pointing out of said edge, the direction [$\bar{1}\bar{1}2$] extending from a leading portion of said edge toward an abruptly-ending trailing portion.

2. A pressure scanning diamond stylus having an elongated lower edge in a wear resistant crystallographic orientation, said edge lying substantially, with a tolerance range of about ±15°, in a crystallographic cubic plane of the type (100) and extending parallel to a direction of the type [011].

3. A pressure scanning diamond stylus having an elongated lower edge in a wear resistant crystallographic orientation, said edge lying substantially, with a tolerance range of about ±15°, in a dodecahedral plane of the type (110) and extending parallel to a direction of the type [1̄10].

4. A stylus as claimed in claim 1, said edge lying vertically tilted downwardly from the recited orientation by an angle of about 3° to 10° whose vertex lies at a leading portion of said edge.

5. A stylus as claimed in claim 2, said edge lying vertically tilted downwardly from the recited orientation by an angle of about 3° to 10° whose vertex lies at a leading portion of said edge.

6. A stylus as claimed in claim 3, said edge lying vertically tilted downwardly from the recited orientation by an angle of about 3° to 10° whose vertex lies at a leading portion of said edge.

7. A method of using a diamond stylus at least for guiding a pickup in a groove on a record, the groove containing information-storing, physical undulations of a broad-band signal frequency mix, the stylus being rounded for contacting both walls of the groove, the method comprising moving the stylus relative to the record in the groove, whereby a friction force is exerted on the stylus by the record, and orienting the stylus 1) with a face substantially vertical with respect to the record for creating sudden losses of contact between the stylus and the undulations and 2) with the direction of the friction force lying substantially, with a tolerance range of about ±15°, in a crystallographic octahedral plane of the type (111) and extending parallel to a direction of the type [1̄1̄2], the vector [111] pointing out of the stylus and into the record, the direction [1̄1̄2] extending in the same direction as said friction force.

8. A method of using a diamond stylus at least for guiding a pickup in a groove on a record, the groove containing information-storing, physical undulations of a broad-band signal frequency mix, the stylus being rounded for contacting both walls of the groove, the method comprising moving the stylus relative to the record in the groove, whereby a friction force is exerted on the stylus by the record, and orienting the stylus 1) with a face substantially vertical with respect to the record for creating sudden losses of contact between the stylus and the undulations and 2) with the direction of the friction force lying substantially, with a tolerance range of about ±15°, in a crystallographic cubic plane of the type (100) and extending parallel to a direction of the type [011].

9. A method of using a diamond stylus at least for guiding a pickup in a groove on a record, the groove containing information-storing, physical undulations of a broad-band signal frequency mix, the stylus being rounded for contacting both walls of the groove, the method comprising moving the stylus relative to the record in the groove, whereby a friction force is exerted on the stylus by the record, and orienting the stylus (1) with a face substantially vertical with respect to the record for creating sudden losses of contact between the stylus and the undulations and (2) with the direction of the friction force lying substantially, with a tolerance range of about ±15°, in a dodecahedral plane of the type (110) and extending parallel to a direction of the type [1̄10].

10. A method as claimed in claim 7, said stylus having a lower edge lying vertically tilted downwardly from the direction of the friction force by an angle of about 3° to 10° whose vertex lies at a leading portion of the stylus.

11. A method as claimed in claim 8, said stylus having a lower edge lying vertically tilted downwardly from the direction of the friction force by an angle of about 3° to 10° whose vertex lies at a leading portion of the stylus.

12. A method as claimed in claim 9, said stylus having a lower edge lying vertically tilted downwardly from the direction of the friction force by an angle of about 3° to 10° whose vertex lies at a leading portion of the stylus.

13. A method as claimed in claim 7, said pickup being adapted for pressure scanning, the physical undulations providing signal oscillations in the megacycles/second range.

14. A method as claimed in claim 8, said pickup being adapted for pressure scanning, the physical undulations providing signal oscillations in the megacycles/second range.

15. A method as claimed in claim 9, said pickup being adapted for pressure scanning, the physical undulations providing signal oscillations in the megacycles/second range.

* * * * *

UNITED STATES PATENT OFFICE
CERTIFICATE OF CORRECTION

Patent No. 3,781,020                Dated December 25th, 1973

Inventor(s) Helmut Batsch et al

It is certified that error appears in the above-identified patent and that said Letters Patent are hereby corrected as shown below:

Column 1, line 36, change "macrosocpically" to --macroscopically--.

Column 6, line 55, after "extending" insert --substantially, with a tolerance of about $\pm 15°$,--; line 64, after "extending" insert --substantially, with a tolerance of about $\pm 15°$,--.

Column 7, line 3, after "extending" insert --substantially, with a tolerance of about $\pm 15°$,--; line 30, after "extending" insert --substantially, with a tolerance of about $\pm 15°$,--.

Column 8, line 1, after "extending" insert --substantially, with a tolerance of about $\pm 15°$,--; line 16, after "extending" insert --substantially, with a tolerance of about $\pm 15°$,--; line 36, change "megacycles/." to --megacycles/--; line 40, change "megacycles/." to --megacycles/--; line 44, change "megacycles/." to --megacycles/--.

Signed and sealed this 4th day of February 1975.

(SEAL)
Attest:

McCOY M. GIBSON JR.            C. MARSHALL DANN
Attesting Officer              Commissioner of Patents